US008641792B2

(12) United States Patent
Vladaj et al.

(10) Patent No.: US 8,641,792 B2
(45) Date of Patent: Feb. 4, 2014

(54) AIR INTAKE SYSTEM

(75) Inventors: Tony Marcel Prel Vladaj, Beauvais (FR); Valentin Daniel Joel Leconte, Beauvais (FR)

(73) Assignee: Agco SA, Beauvais (FR)

( * ) Notice: Subject to any disclaimer, the term of this patent is extended or adjusted under 35 U.S.C. 154(b) by 163 days.

(21) Appl. No.: 12/993,839

(22) PCT Filed: May 12, 2009

(86) PCT No.: PCT/EP2009/055714

§ 371 (c)(1), (2), (4) Date: Nov. 20, 2010

(87) PCT Pub. No.: WO2009/141247

PCT Pub. Date: Nov. 26, 2009

(65) Prior Publication Data

US 2011/0072769 A1 Mar. 31, 2011

(30) Foreign Application Priority Data

May 20, 2008 (GB) .................................. 0809111.8

(51) Int. Cl.
*B01D 46/00* (2006.01)

(52) U.S. Cl.
USPC ................ 55/385.3; 55/431; 55/482; 55/466; 55/467

(58) Field of Classification Search
None
See application file for complete search history.

(56) References Cited

U.S. PATENT DOCUMENTS

| | | | | |
|---|---|---|---|---|
| 3,915,679 | A * | 10/1975 | Roach et al. | 55/347 |
| 4,028,076 | A * | 6/1977 | Fields | 55/394 |
| 4,204,848 | A * | 5/1980 | Schulmeister et al. | 55/315.2 |
| 4,218,223 | A * | 8/1980 | Lidstone et al. | 95/271 |
| 4,242,115 | A * | 12/1980 | Harold et al. | 55/347 |
| 4,248,613 | A * | 2/1981 | Linhart | 55/394 |
| 4,469,490 | A * | 9/1984 | Wilson | 95/269 |
| 4,482,365 | A * | 11/1984 | Roach | 96/408 |
| 5,401,285 | A * | 3/1995 | Gillingham et al. | 55/284 |
| 5,480,464 | A * | 1/1996 | De Villiers et al. | 55/320 |
| 6,681,726 | B2 * | 1/2004 | Linsbauer et al. | 123/41.65 |

* cited by examiner

*Primary Examiner* — Duane Smith
*Assistant Examiner* — Phillip Shao

(57) ABSTRACT

An air intake system (20) for a utility vehicle engine (16) is provided. The system comprises an air filter module (21) having a pre-filter (22) upstream of a main filter (24) wherein the pre-filter serves to extract dust from the air stream. The system further comprises a fan module (32) which is dedicated to deliver a scavenging vacuum which sucks said dust through a scavenger vent (28) in the pre-filter. The fan module (34) is secured to the air filter module (21). By providing a dedicated fan for extracting the dust from the system the reliance on the engine exhaust to provide the vacuum is removed. Furthermore, the securing of the fan module to the air filter module reduces the number of components on the vehicle assembly line.

7 Claims, 2 Drawing Sheets

AIR INTAKE SYSTEM

The invention relates to an air intake system, particularly, but not exclusively, one for a utility vehicle engine.

Utility vehicles such as agricultural tractors and plant machinery are often required to work in dusty environments. In order to avoid dust particulates entering the air intake of an internal combustion engine of the vehicle it is well known to provide a means of filtering the air upstream of the engine.

Such known air intake systems comprise a pre-filter attached in series (in terms of airflow) with a main filter unit. The former serves to provide a preliminary means to remove the larger dust particles from the airflow whilst the main filter unit has a filter for removing smaller particulates. Without the pre-filter the main filter unit would clog up in an unacceptably short time.

The collected dust is removed from the pre-filter chamber via a duct and exploiting a vacuum typically created from the engine exhaust or fan shroud. However, the necessary connection with the engine exhaust system can limit simple structural modifications thereto.

Thus, it is an object of the present invention to provide an improved air filter system which alleviates the aforementioned problem.

In accordance with the present invention there is provided an air intake system for a utility vehicle engine, the system comprising an air filter module having a pre-filter upstream of a main filter, the pre-filter serving to extract dust from the air stream, the system further comprising a fan module which is dedicated to deliver a scavenging vacuum which sucks said dust through a scavenger vent in the pre-filter, said fan module being secured to the air filter module. By providing a dedicated fan to remove the dust from the pre-filter, the reliance on the engine exhaust system is removed. Furthermore, the securing of the fan module to the filter module delivers a compact and sturdy unit which can be easily incorporated into the available space under a tractor hood for example.

The scavenger vent may be disposed on a sidewall of the pre-filter and arranged to eject dust in a direction substantially perpendicular to the general direction of the air stream through the air filter module. This ensures minimal disturbance of the main flow of air through the air filter module.

The fan is preferably powered by an electrical motor. Advantageously, this delivers a dust extraction process that can be independent of the engine speed thereby avoiding inferior dust extraction at low engine speeds. For example, the fan can be driven by the tractor electronic control unit at a speed which depends upon the dust content of the intake air rather than the engine speed. This gives a significant power saving thus improving fuel economy. The fan speed may be adjustable manually and/or automatically in response to sensed operating conditions.

Alternatively, the fan may be driven by a hydraulic motor.

Preferably, the scavenger vent includes a spout to which the fan module is simply secured.

Preferably, the fan module is detachably secured to the air filter module. This enables easy assembly and maintenance of the fan module and air filter module.

When fitted to a utility vehicle the system may further comprise an evacuation duct which is connected between the fan outlet and the atmosphere. In one preferred arrangement, the evacuation duct is arranged to vent said dust through the underside of the vehicle. The downstream end of the evacuation duct is preferably secured to a support plate having a hole through which the dust is vented, wherein the support plate is fixed relative to a vehicle frame.

Further advantages of the invention will become apparent from the following description of a specific embodiment with reference to the appended figures in which.

Figure 1:
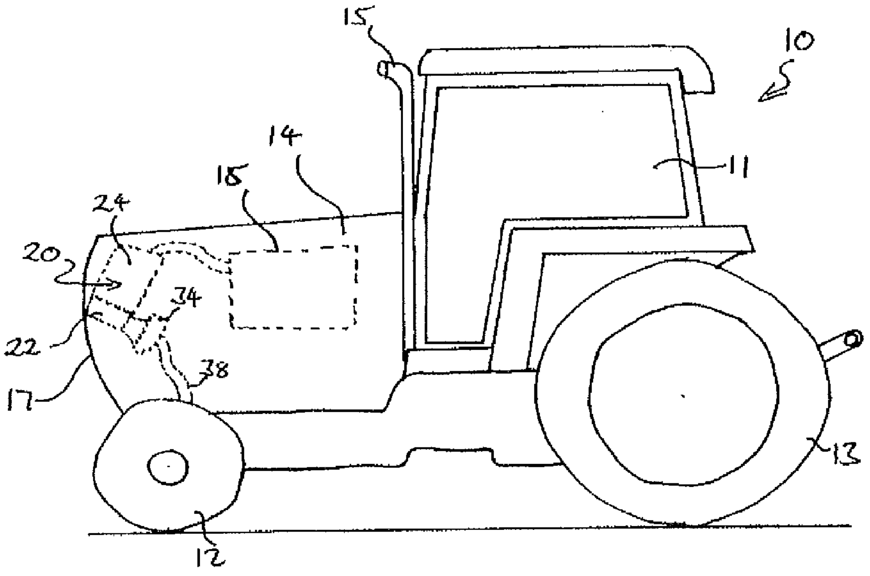
FIG. 1 is a schematic view of a tractor having an air intake system in accordance with the invention.

With reference to FIG. 1, a tractor 10 comprises a cab 11, front and rear wheels 12, 13 and engine compartment 14, and engine exhaust 15. Within the engine compartment 14 there is housed an engine 16 and an air intake system 20 in accordance with the invention. The front wall of the engine compartment 14 comprises a grille 17 through which air from the surroundings can reach the air intake system 20.

Figure 2:
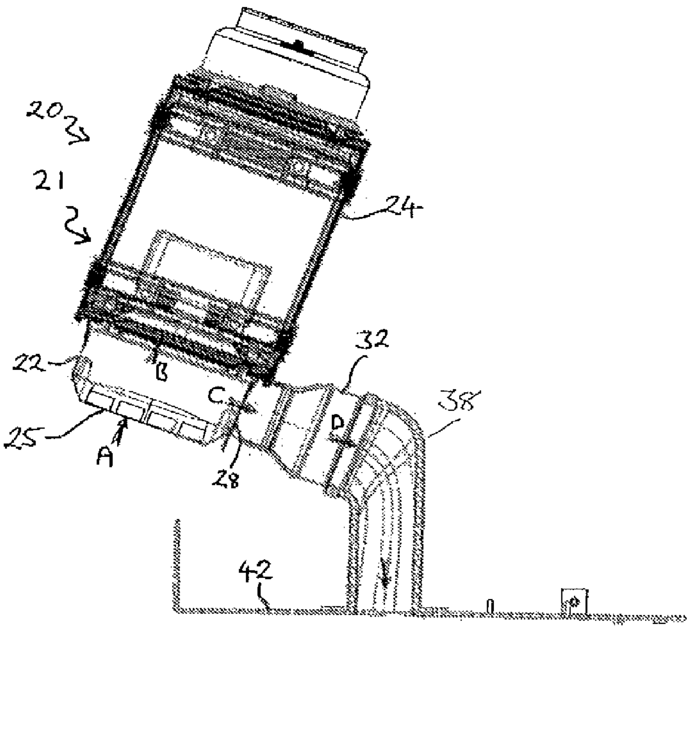
FIG. 2 is a side view of the air intake system of FIG. 1 in isolation; and, FIG. 3 is an exploded side view of the air intake system of FIG. 2.

FIG. 2 shows the air intake system 20 in more detail. An air filter module 21 comprises a pre-filter 22 and a main filter 24 as per known air intake filter assemblies. The pre-filter 22 is attached to an intake end of the main air filter unit 24. An air intake vent 25 is built into a wall of the pre-filter 22 and comprises a mesh through which dusty air passes (arrow A) from the outside of the vehicle 10 to the pre-filter 22.

The system 20 provides a two-stage air cleaning process. The main air stream passes through the pre-filter 22 and into the main filter 24 (arrow B). The pre-filter 22 works on a centrifugal basis in which the air flow is circulated so as to force the dust to the outside of the chamber.

Subsequently, relatively clean air leaves the pre-filter 22 and is further cleaned by the main air filter unit 24 thus providing a second stage of cleaning before being conveyed to engine 16. The present invention concerns the pre-filter step and, in particular, the means to provide a vacuum to remove, or scavenge, the collected dust therefrom.

Figure 3:
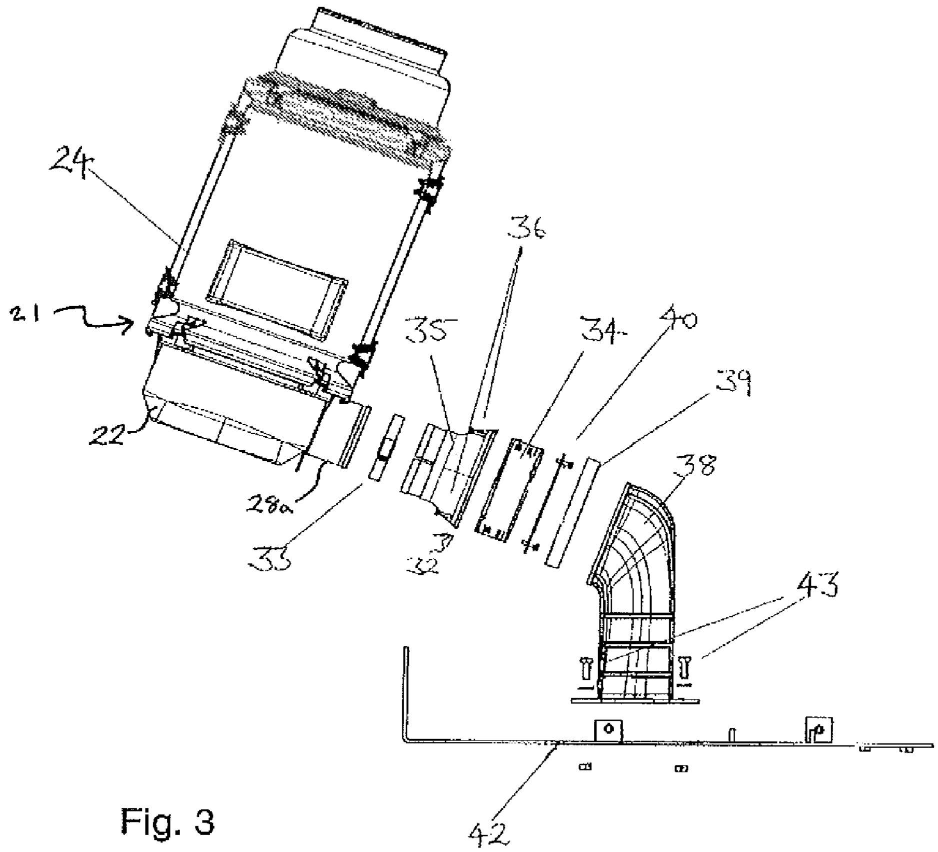

A scavenger vent 28 is disposed in the sidewall of the pre-filter housing 22 and provides an exit path (arrow C) for the collected dust. Shown best in FIG. 3, the scavenger vent 28 includes an integrated spout **28*a*** through which the dust is ejected.

A fan module 32 is secured to the spout **28*a* by means of a clamp 33. The fan module 32 comprises an electrically-powered fan 34 fixed to a tapered adaptor bracket 35 by a series of bolts 36. The tapered bracket 35 serves to adapt the diameter of the air passage between the spout 28*a* and the fan housing 34**.

It should be appreciated that the fan 34 is housed within a sleeve and that the impellor blades cannot be seen from the figures. The fan 34 is in line with the scavenging air stream (arrow D) and so the dust passes through the housing thereof. The electrical motor (not shown) is also housed within the enclosed air passage and is connected by wires (also not shown) to an electronic control unit (ECU).

To the output side of the fan housing 34, an evacuation duct 38 is secured via a foam seal 39 and a bracket 40. The evacuation duct 38 is secured at the opposite end to a support plate 42 by bolts 43. The support plate 42 is fixed relative to the frame of the tractor.

The fan 34 serves to provide the necessary scavenging vacuum to extract the dust from the pre-filter 22. The dust is drawn through scavenger vent 28 and fan module 32 (arrow D), before being forced out through the evacuation duct 38 and into the surrounding environment though a hole in the support plate 42. The positioning of the venting orifice on the underside of the tractor advantageously further assists the dust to fall through the evacuation duct 38 by means of gravity.

The fan motor is controlled by the ECU which can optionally vary the speed of the fan depending on the working conditions of the vehicle and engine speed for example. Due to the provision of a fan that is dedicated to scavenging the dust, the fan speed can be controlled independently of the engine speed thus allowing optimal operation according to working conditions.

By mounting the fan module 34 directly to the air filter module 21 the air intake system 20 can be assembled with greater ease thus saving time and expense and increasing throughput. Furthermore, the air intake system can be manufactured and supplied in a single integrated unit (i.e. including the fan module) which significantly reduces the number of parts required on the assembly line.

Although described in relation to a tractor, it is envisaged that the air intake system described can be implemented in any utility vehicle without deviating from the scope of the invention.

In summary there is provided an air filter system 20 for a utility vehicle 10 comprising a dust extraction chamber 22, an air intake vent 25 through which air passes from the surroundings to the chamber 22, an air filter unit 24, an air outlet vent 28 through which air passes from the chamber 22 to the air filter unit 24, and a fan 34 which is arranged to extract dust from the chamber 22. By providing a dedicated fan 34 for extracting the dust from the system the reliance on the engine exhaust is removed.

The invention claimed is:

1. An air intake system for a utility vehicle engine, the system comprising an air filter module having a pre-filter upstream of a main filter, the pre-filter serving to extract dust from the air stream, the system further comprising a fan module which is dedicated to deliver a scavenging vacuum which sucks said dust through a scavenger vent in the pre-filter, said fan module being secured to the air filter module, the system further comprising an evacuation duct which is connected between the fan outlet and the atmosphere, wherein the evacuation duct is arranged to vent said dust through the underside of the vehicle.

2. A system according to claim 1, wherein the fan module comprises a fan powered by an electrical motor.

3. A system according to claim 1, wherein the scavenger vent is disposed on a sidewall of the pre-filter and is arranged to eject dust in a direction substantially perpendicular to the general direction of the air stream through the air filter module.

4. A system according to claim 1, wherein the scavenger vent includes a spout to which the fan module is secured.

5. A system according to claim 1, wherein the fan module is detachably secured to the air filter module.

6. A system according to claim 1, wherein the downstream end of the evacuation duct is secured to a support plate having a hole through which the dust is vented, wherein the support plate is fixed relative to a vehicle frame.

7. A system according to claim 1, wherein the fan is driven at a speed which is independent of the engine speed of the vehicle.

* * * * *